US008874086B2

(12) United States Patent
Huang et al.

(10) Patent No.: US 8,874,086 B2
(45) Date of Patent: Oct. 28, 2014

(54) PROVIDING RELEVANT ADVERTISEMENTS OR OTHER CONTENT BASED ON A COMMUNICATIONS IDENTIFIER

(75) Inventors: Xuedong Huang, Bellevue, WA (US); Milind V. Mahajan, Redmond, WA (US); Abhiram G. Khune, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 746 days.

(21) Appl. No.: 12/027,516

(22) Filed: Feb. 7, 2008

(65) Prior Publication Data

US 2009/0203361 A1    Aug. 13, 2009

(51) Int. Cl.
  *H04M 3/42*    (2006.01)
  *H04M 1/64*    (2006.01)
  *H04M 3/487*   (2006.01)
  *H04M 1/56*    (2006.01)
  *H04M 1/2745*  (2006.01)
  *G06Q 30/02*   (2012.01)
  *H04M 1/725*   (2006.01)
  *H04M 1/57*    (2006.01)

(52) U.S. Cl.
  CPC .......... *H04M 1/575* (2013.01); *H04M 2250/60* (2013.01); *H04M 1/72547* (2013.01); *H04M 3/4878* (2013.01); *H04M 1/72569* (2013.01); *H04M 1/72572* (2013.01); *H04M 1/56* (2013.01); *H04M 1/576* (2013.01); *H04M 1/274516* (2013.01); *H04M 1/578* (2013.01); *H04M 1/274583* (2013.01); *H04M 1/72566* (2013.01); *G06Q 30/02* (2013.01); *H04M 1/7253* (2013.01); *H04M 1/274525* (2013.01)
  USPC ........................................ 455/414.1; 379/70

(58) Field of Classification Search
  USPC ........... 455/414.1, 414.2, 414.3, 415; 379/70, 379/67.1, 201.01
  See application file for complete search history.

(56) References Cited

U.S. PATENT DOCUMENTS 6,683,941 B2   1/2004  Brown et al.
6,750,883 B1   6/2004  Parupudi et al.
  (Continued)

FOREIGN PATENT DOCUMENTS

CN    1273655    11/2000
CN    1366760    8/2002
  (Continued)

OTHER PUBLICATIONS

"Google Cell Phone (GPhone) and Its Prospects", http://www.computer-advice.info/2006/12/18/google-cell-phone-gphone-and-its-prospects/.

(Continued)

*Primary Examiner* — Kent Chang
*Assistant Examiner* — Scott Au
(74) *Attorney, Agent, or Firm* — Joann Dewey; Doug Barker; Micky Minhas

(57) ABSTRACT

Described is a technology by which a communications identifier such as a telephone number is used in selecting relevant content (e.g., an advertisement) for outputting as audible and/or visible information to a destination device. The communications identifier is used like a search term/keyword to determine content relevant to that identifier. A telephone number may be the identifier, selected based on a partially-dialed or actually dialed number, or a user's current scrolling position among listed telephone numbers. A telephone number of an incoming call may be used as the identifier. Profile data and/or state data may be used in selecting relevant content. Some of the profile data may be mined based on previous user activities. In one example, the content may be provided via a remote source of the content, and used immediately or cached for later use (e.g., output).

14 Claims, 12 Drawing Sheets

(56) References Cited

U.S. PATENT DOCUMENTS

| | | | |
|---|---|---|---|
| 6,937,699 | B1* | 8/2005 | Schuster et al. ............. 379/67.1 |
| 7,035,252 | B2 | 4/2006 | Cave et al. |
| 7,076,051 | B2 | 7/2006 | Brown et al. |
| 7,187,761 | B2* | 3/2007 | Bookstaff ................ 379/201.01 |
| 7,464,086 | B2 | 12/2008 | Black et al. |
| 7,715,533 | B2* | 5/2010 | Pradhan et al. ............ 379/88.22 |
| 7,826,605 | B1* | 11/2010 | Vanier et al. ............. 379/211.01 |
| 2002/0048283 | A1 | 4/2002 | Lin |
| 2002/0160762 | A1* | 10/2002 | Nave et al. .................... 455/414 |
| 2002/0160793 | A1* | 10/2002 | Pradhan et al. ............... 455/466 |
| 2002/0191775 | A1 | 12/2002 | Boies et al. |
| 2003/0050837 | A1* | 3/2003 | Kim ................................ 705/14 |
| 2003/0135582 | A1 | 7/2003 | Allen et al. |
| 2004/0147265 | A1 | 7/2004 | Kelley et al. |
| 2004/0153373 | A1 | 8/2004 | Song et al. |
| 2006/0217110 | A1 | 9/2006 | Othmer |
| 2007/0081662 | A1 | 4/2007 | Altberg et al. |
| 2007/0130538 | A1* | 6/2007 | Chiu .............................. 715/792 |
| 2007/0186165 | A1 | 8/2007 | Maislos et al. |
| 2007/0208686 | A1 | 9/2007 | Gupta |
| 2008/0027707 | A1 | 1/2008 | Stefik |
| 2008/0059299 | A1* | 3/2008 | Hamoui ........................ 705/14 |
| 2008/0077558 | A1 | 3/2008 | Lawrence |
| 2008/0132251 | A1 | 6/2008 | Altman |
| 2008/0146206 | A1 | 6/2008 | Pichardo |
| 2008/0146210 | A1* | 6/2008 | Somani et al. ................ 455/418 |
| 2008/0208973 | A1 | 8/2008 | Hayashi |
| 2008/0242280 | A1* | 10/2008 | Shapiro et al. ............. 455/414.3 |
| 2008/0256453 | A1 | 10/2008 | Fein et al. |
| 2008/0294997 | A1 | 11/2008 | Weitz |
| 2009/0077027 | A1 | 3/2009 | King et al. |
| 2009/0111487 | A1* | 4/2009 | Scheibe ...................... 455/456.6 |
| 2009/0147778 | A1* | 6/2009 | Wanless et al. ............... 370/389 |
| 2009/0185667 | A1* | 7/2009 | Bychkov et al. ................ 379/69 |
| 2009/0203361 | A1 | 8/2009 | Huang et al. |
| 2009/0254824 | A1 | 10/2009 | Singh |
| 2011/0145823 | A1 | 6/2011 | Rowe et al. |

FOREIGN PATENT DOCUMENTS

| | | |
|---|---|---|
| CN | 101022294 | 8/2007 |
| GB | 2382279 A | 5/2003 |
| GB | 2396529 A | 6/2004 |
| GB | 2407230 A | 4/2005 |
| GB | 2428349 A | 1/2007 |
| GB | 2459437 A | 9/2012 |
| JP | 2003-240590 | 8/2003 |
| JP | 2003256713 A1 | 9/2003 |
| JP | 2005-072692 | 3/2005 |
| JP | 2005072692 | 3/2005 |
| JP | 2005148289 A | 6/2005 |
| JP | 2005-192209 | 7/2005 |
| KR | 10-1120721 | 2/2012 |
| WO | WO 2007146273 | 12/2001 |
| WO | WO 02/03672 A1 | 1/2002 |
| WO | WO 02/069585 A2 | 9/2002 |
| WO | WO2006/130783 | 12/2006 |
| WO | 2007006345 A1 | 1/2007 |
| WO | WO 2007/038775 A2 | 4/2007 |

OTHER PUBLICATIONS

"New service would display ads based on keywords you say in phone calls", http://blogs.zdnet.com/ip-telephony/?p=2408.
"ThePudding: Targeted Advertising Comes to Phone Calls", http://www.techcrunch.com/2007/09/24/thepudding-targeted-advertising-comes-to-phone-calls/.
Search Report Ref P/10816.360GB, for Application No. GB0806507.0, date of search Aug. 3, 2008.
Search Report Ref EP57966TE900aha, for Application No. 08154799.4-2221, date Dec. 3, 2008.
Arias et al., "Context-Based Personalization for Mobile Web Search", Published Aug. 24, 2008, http://persdb08.stanford.edu/5-PersDB-Paper.pdf, 7 pages.
Arikawa et al., "NAVITIME: Supporting Pedestrian Navigation in the Real World", Published 2007, Urban Computing, http://ieeexplore.ieee.org/stamp/stamp.jsp?arnumber=04287440, 9 pages.
Magni, "Design and Implementation of a Context Aware Mobile GIS", Published Apr. 2008, Politecnico Di Milano, http://geomatica.como.polimi.it/corsi/tesi/MagniD_NAMGIS_PhDThesis.pdf, 212 pages.
EP Search Report dated Sep. 15, 2009 regarding Appln. No. 08154799.4 (Ref. No. EP57966TE900aha), 4 pages.
UK Examination Report dated Dec. 19, 2011 regarding UK Appln. GB0806507.0 5 pages.
PCT Search Report mailed Jan. 2, 2012 regarding PCT/US2011/038256 9 pages.
Non-Final Office Action mailed Dec. 21, 2011 regarding U.S. Appl. No. 12/791,091 23 pages.
Final Office Action mailed Jun. 19, 2012 regarding U.S. Appl. No. 12/791,091 34 pages.
UK Examination Report mailed Mar. 2, 2012 regarding UK Appln. GB0806507.0 2 pages.
Lamas, et al. "A Mobile Geographic Information System Managing Context-Aware Information Based on Ontologies" Available at: http://www.ubicc.org/files/pdf/1_361.pdf—Retrieved May 21, 2013.
Non-Final Office Action mailed Feb. 19, 2013 in U.S. Appl. No. 12/791,091.
First Office Action, mailed Nov. 2, 2012, in CN Application 200810092127.5.
Non Final OA, mailed Sep. 7, 2012, in JP Application No. 2008-094800.
Shaw, Russell, "New service would display ads based on keywords you say in phone calls," http://www.zdnet.com/blog/ip-telephony/new-service-would-display-ads-based-on-keywords-you-say-in-phone-calls/2408, stated publication date Sep. 24, 2007; last-accessed on Jun. 19, 2013, 8 pages.
Non Final OA Received in CN Application No. 200810092127.5, mailed Jul. 8, 2013.
Final OA received in JP Application No. 2008-094800, mailed May 31, 2013.
JP Interrogatory Office Action mailed Dec. 24, 2013 in JP Application No. 2008-94800.
Third Chinese Office Action mailed Dec. 12, 2013 in CN Application No. 200810092127.5.
"Final Office Action Received in China Patent Application No. 2008100921275" dated May 5, 2014 6 pages.
Non-Final Office Action mailed Feb. 19, 2013 in U.S. Appl. No. 12/791,091, 38 pages.
"Office Action Received in China Patent Application No. 200810092127.5" dated Aug. 27, 2013 with Chinese Search Report dated Aug. 19, 2013, 8 pages.
Final Office Action mailed Sep. 26, 2013 in U.S. Appl. No. 12/791,091, 29 pages.
Australian Examination Report dated Feb. 6, 2014 in Application No. 2011261662, 3 pages.
European Search Report dated Apr. 9, 2014 in Application No. 11790234.6, 8 pages.
Hongjoo Lee et al., "Context-Aware Recommendations on the Mobile Web," Jan. 1, 2005, On The OVE To Meaningful Internet Systems 2005: OTM Workshops Lecture Notes In Computer Science; LNCS, Springer, Berlin, DE, pp. 142-151, XP019023124, ISBN: 978-3-540-297739-0, 10 pages.
"Office Action Received in Chinese Patent Application No. 201180027181.1" dated Apr. 30, 2014, 6 pages.
Non-Final Office Action dated Jul. 8, 2014 in U.S. Appl. No. 12/791,091, 30 pages.
"Office Action Received in Japan Patent Application No. 2008-094800" mailed Jun. 25, 2014, 21 pages.

* cited by examiner

PROVIDING RELEVANT ADVERTISEMENTS OR OTHER CONTENT BASED ON A COMMUNICATIONS IDENTIFIER

BACKGROUND

Some mobile telephone systems provide advertisements to their users. For example, mobile telephones may automatically receive text messages when they enter a new location. As a more particular example, when a user's airplane flight lands in a new city and the user powers up the mobile telephone, text message advertisements may be sent to the user's mobile telephone.

However, these types of advertisements are like email spam in that they are widely sent and for the most part are of little or no value to the user, except when a user bothers to read such a message and by coincidence determines there may be some value to it. Such an advertising model is generally annoying to most users and tends to have a relatively low success rate in generating business compared to other advertising models.

For example, web search-based advertising models such as Windows Live™ Search are well known and continue to become more and more successful. A significant advantage of search-based advertising models is that the user provides keywords for searching for the information in which the user is interested, whereby the search system can provide relevant advertisements that are targeted to the user based on those keywords. Not only does this result in a better success rate with regards to clicking on an advertisement (when compared to spam-like advertising distribution mechanisms that are essentially random), but the advertisements are generally not obnoxious to users because they are relevant to the search.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a communications identifier (such as a telephone number) is used in selecting relevant content (e.g., an advertisement) for outputting to a destination device. In general, this is somewhat analogous to using the communications identifier as a search term/keyword in determining relevant content for that communications identifier.

In one aspect, a telephone number may be used as the identifier based on a user's current scrolling position among a list of telephone numbers, based on a partially dialed number, or based on an actually dialed number. Alternatively, a telephone number of an incoming call (e.g., known via caller ID) may be used as the identifier based on to a source of an incoming telephone call.

In one aspect, profile data and/or state data may be used in selecting the content, e.g., to select more relevant content based on a user's demographics, the current time of day, and so forth. At least some of the profile data may be mined based on previous user activities.

In one implementation, the content may be provided via a remote source of the content. In an alternative implementation, the content may be provided via local cache synchronized from a remote source of the content. Once provided to a destination device, the content may be output as audible and/or visible information on that destination device.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards interactive communications, (e.g., telephony), in which an identifier related to a communication (e.g., a telephone number) is treated like a search query in order to provide content such as an advertisement that is relevant to that communication. By way of example, when a caller makes a telephone call to a callee, the callee or an intermediary such as a service provider (e.g., wireless carrier) can push a relevant advertisement or other customized personal note to the caller on the caller's telephone, personal computer, or other communication device or devices. This works in reverse as well, e.g., the caller or intermediary can push relevant content to the callee. Note that while one such model is push-directed, an initiating or receiving device can instead pull the relevant content.

In one aspect, an identifier such as a telephone number is used like a keyword/search term to locate relevant content. Selection of the relevant content may be based on the identifier, possibly in conjunction with profile information such as user demographics, and/or state data such as the current time and the user's current location. Advertising bidding models may also be used to determine which content is provided. Once selected, the content is presented to the user, such as on a display screen of a mobile telephone.

While many of the examples described herein are directed towards telephone communications, it is understood that other types of identifier-related communication messages, including text messages (SMS/MMS), instant messages, email messages and the like (e.g., computer actions by a user with a known user ID) may similarly result in relevant content being provided. Further, while many of the examples are directed towards content in the form of advertisements, other types of content may be selected, including advertisements, product and/or service reviews, ratings, media (e.g., movie, concert, play) listings, menus of offerings such as a restaurant menu, directions and/or maps.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and/or communication devices in general.

Figure 1:
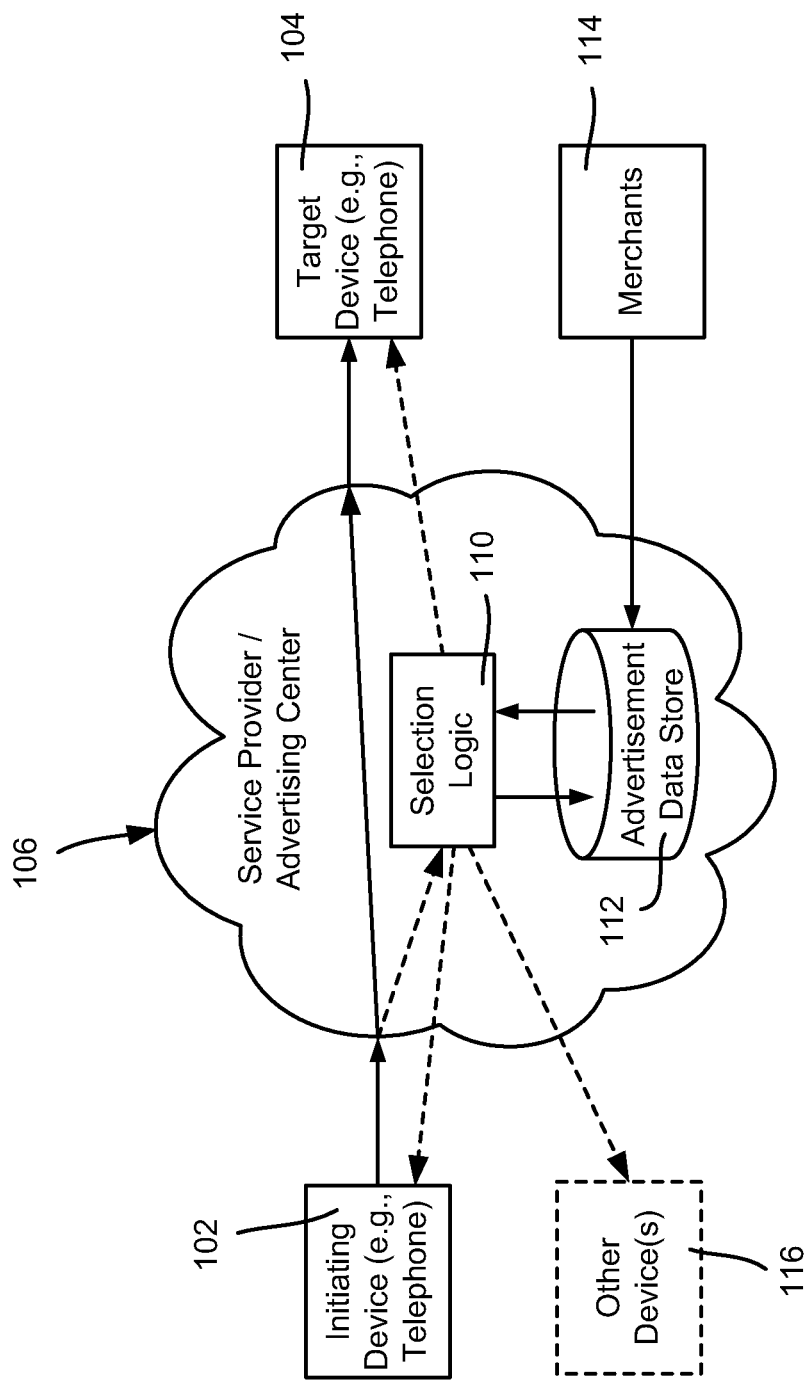
FIG. 1 is a block diagram representing example components for sending relevant content such as advertisements to devices such as one or more mobile telephones based upon a telephone number or other identifier.

Turning to FIG. 1, there is shown a general block diagram representing components for providing relevant content to a device such as a telephone that initiates or receives a communication. For example, when an initiating device in the form of a telephone 102 places a call to a target telephone 104, an intermediary 106 exemplified herein as a service provider/advertising center receives the telephone number for connecting to the target telephone 104. Note that the intermediary 106 generally appears to be a single service from the perspective of the initiating and receiving devices, but may comprise a service provider coupled to the advertising center such as a separate service run by an independent entity; for purposes of this example the service provider and/or advertising center may be in any practical configuration. Further, a carrier is not always necessary, e.g., a device (even in the form of a mobile telephone) may be coupled to an intermediary such as an advertising center or other information source via a network or other computing device, e.g., Wi-Fi or Bluetooth®, without involving a carrier.

Using a telephone call as an example, based on a telephone number, selection logic 110 in the intermediary determines which content is relevant for that particular number. Note that as described below, the initiating device 102 may receive the content, and/or the target device 104 may receive the content. For example, if the initiating device 102 provides a telephone number related to a business, content related to a competing business (e.g., an advertisement) may be output on the initiating device 102. As another example, if the initiating device 102 places a call to a recipient, the receiving telephone may output content related to the initiating device's telephone number, as detected by caller ID; a more particular example is to provide an advertisement for a Mother's Day gift in conjunction with a call determined to be from Mom. Note that the call need not actually be completed for the content to be output, e.g., a missed call or voicemail message can result in the content being displayed, such as at a later time when the user is reviewing missed calls or dialing in for messages.

While any type of content may be provided for an identifier, providing advertising based on an identifier is one appropriate business model. To this end, and advertisement (or set of advertisements) within an advertisements data store 112 is sent to the first device 102 and/or second device 104, either immediately on demand or at some later time, (or for pre-caching as described below with reference to FIG. 2). A typical relevant advertisement may be provided as a text message or a graphics image. Note that while in FIG. 1 merchants 114 are shown as providing commercial advertisements to the service provider/advertising center, other content such as the caller's image or icon, reviews, ratings, listings, a map or directions and so forth, may be provided, from any source. Thus, while FIG. 1 exemplifies an advertisement data store 112 within the intermediary advertising center, this is only one example of a type of relevant content and a source.

Further, while content is described as being provided and sent, it is straightforward for the merchant or the like to provide a link or other reference by which the service provider/advertising center or device may retrieve the relevant content. Note that the link need not be followed by a conventional browser; for example an application that outputs contacts or call history list can follow the link, obtain the content, and insert a representation of the content into its output.

Moreover, an initiating telephone or other device need not actually make a telephone call (or send a message) to receive and output relevant content, but rather need only provide the identifier (e.g., the telephone number or email address) to the intermediary. By way of example, a user of the initiating device may be scrolling through a contacts or other list (e.g., a call history) of telephone numbers. If the user pauses for some sufficient time on a particular number, even though a call has not yet been requested that number may be transmitted to the intermediary, which then may return relevant content based on that telephone number.

Note that providing relevant content during scrolling has the advantage of the user not yet having made a selection, and also that the user is typically looking at the device when scrolling. However, even if an advertisement or other content appears after a call is placed, there is still a benefit because of the advertisement appearing in conjunction with a transaction. For example, people calling businesses are probably looking to transact some business in the immediate future, whereby the ability to target customers at this stage is valuable to competitors and those selling complementary and follow-on products. For example, when a customer calls a real-estate agent, other real-estate agents as well as mortgage brokers and perhaps later to home insurance companies and home appliance companies may benefit from having an advertisement related to that call. As another example, expensive items such as cars, real-estate, mortgages, cruises and vacation bookings often involve considerable calling activity before buying, whereby targeted advertising may persuade a caller to select another offer.

The content need not be provided to the device, but can be alternatively provided to one or more other devices 116, such as to a personal computer affiliated with the calling device. For example, a telephone user that scrolls to a number or calls a number may receive an email or instant message on a personal computer or other device. Other content may be output on a related device such as a computer, particularly if the telephone is currently coupled to that via some interface. For example, graphics may pop-up, a browser can automatically navigate to a new page, a speaker can output an audible message, and so forth; note that the content need not be visible. Indeed, any conventional landline or VoIP telephone may receive audio content (a return telephone call or voice mailbox message) in response to initiating a call. For example, a call placed to a car dealership's sales number may result in a competing car dealership calling back with an automated message advertising that dealership's latest deals.

Figure 2:
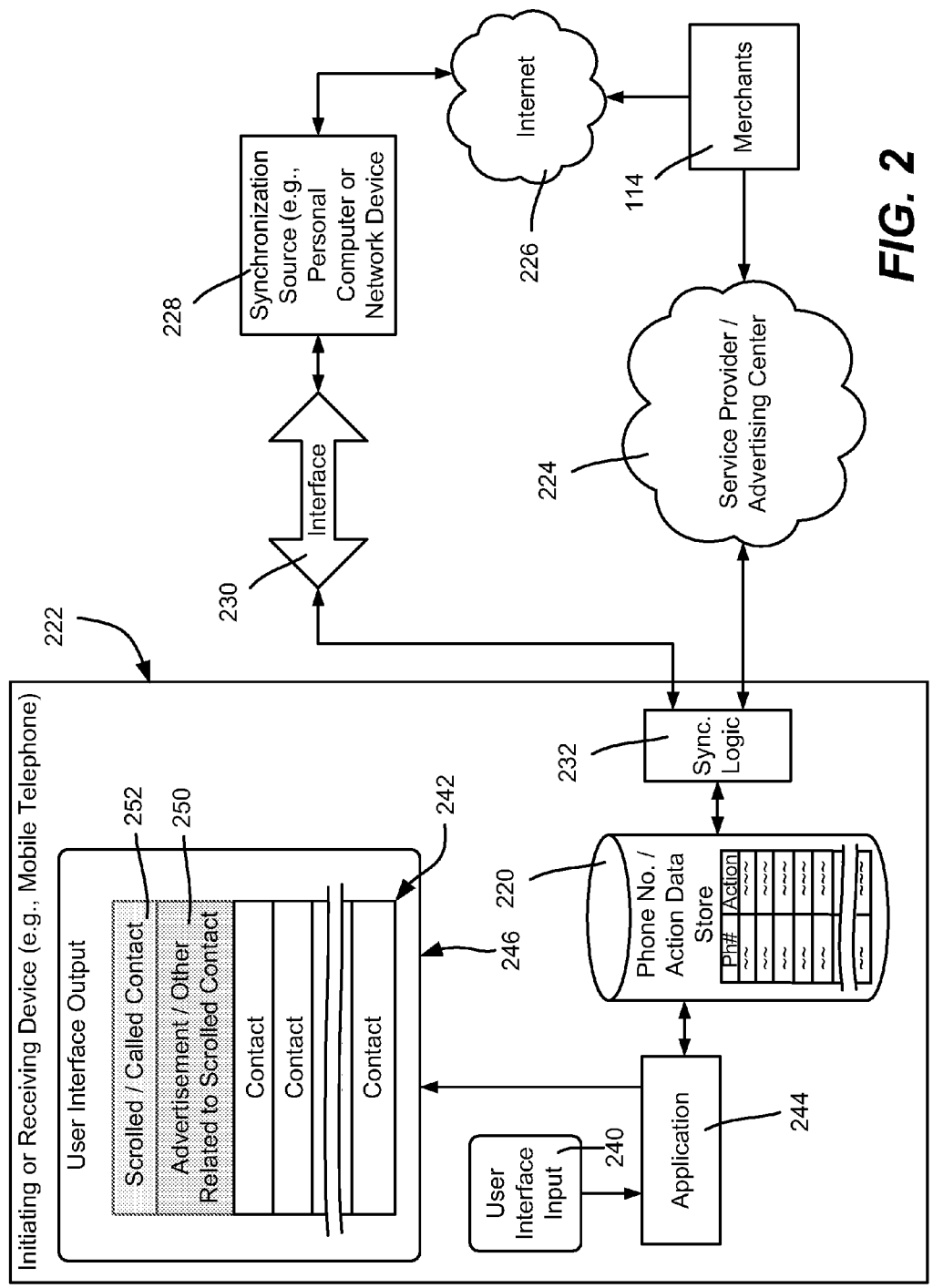
FIG. 2 is a block diagram representing example components for sending relevant content such as advertisements to a mobile telephone to cache for possible later output based upon a telephone number or other identifier.

FIG. 2 exemplifies another implementation, in which some of the content (and/or references thereto) is cached on a data store 220 of an initiating or receiving device 222, such as a mobile telephone. Among other benefits, caching avoids latency, which may be particularly advantageous when there is limited time to display content before a call is connected. Once connected, the content may still be rendered, but it may be too late for the user to notice (unless on speakerphone) until the call is completed. Another benefit of having cached data is that the information and advertisements can be displayed even in offline scenarios and scenarios where the network bandwidth costs are high (e.g. national and international roaming).

In general, an intermediary 224 such as service provider/ advertising center receives data such as advertisements from merchants 114, and can download cacheable information to the data store 220 via a device's normal antenna. Alternatively or in addition to, such information may be transferred from the Internet 226 or other network source via a synchronization source 228 such as a personal computer or wireless network to which the initiating device connects through some interface 230 (e.g., by any wireless such as Wi-Fi or Bluetooth®, by physical docking, and so forth). Synchronization logic 232 is exemplified as handling the receipt of such information and updating of the caching data store 220.

Synchronization may be performed in many ways, and may be dependent on an individual device's resources. For example, if not much memory is available for a cache, synchronization may use a prediction-type mechanism based on historical data, such as what numbers user is likely to call in near future. If sufficient memory exists, a cache may hold an entire business directory, based on the user's (or device's) area code and possibly other nearby area codes, for example, with some or all of the listed numbers having corresponding content. Such a cache may be pre-loaded when a device is purchased, or is coupled to the Internet via a high-bandwidth device such as a personal computer or Wi-Fi coupling. Synchronization may be nightly, and/or when a device is detected as not in use such as when charging or not moving. Some real-time synchronization is possible, but not essential (except if some rogue content or the like is detected as having been sent for caching and many users are complaining).

In a contacts-based example as generally represented in FIG. 2, as the user interacts to provide input 240 to scroll through a contacts list 242 and/or to place a call, as controlled by an appropriate application 244, an advertisement or other content relevant to the currently scrolled or called item appears on the user interface output 246. For example, an advertisement (or other content) 250 may be inserted into the contacts list so as to be adjacent the scrolled or called item 252.

Figure 3:
FIG. 3 is a representation of an example mobile telephone including a user interface on which relevant content appears in conjunction with a telephone number list.

FIG. 3 provides a more specific example, in which a user has scrolled or places a call to a pizza restaurant as exemplified by shaded item 330. Another pizza restaurant, which for example has bid to provide a relevant advertisement when a user scrolls to or calls a contact represented by the currently selected contact item 330, as identified by the item's telephone number, has its advertisement 332 appear adjacent the contact item 330.

Also represented in FIG. 3 is a "*****Reviews" link 334 associated with the contact item 330. The reviews may be independent of the user, but may be weighted based on known friends of that user, such as gleaned from the user's calling records, social networking buddy lists, and so forth. Via the reviews, a user may discover that his friends do not particularly enjoy the pizza restaurant from which he was going to order. The reviews, along with the special price being offered by the competitor, may convince the user to call the advertised "Competitor's Pizza" instead.

The example of FIG. 3, with or without the reviews link 334, may be implemented on the example model of FIG. 1 or the example model of FIG. 2. In other words, the relevant content (in this example the graphical advertisement 332) may be made available on a mobile telephone or any computing device from an intermediary 106 (FIG. 1) or via pre-loaded cached information in a local data store 220 (FIG. 2). Content also may be combination of locally cached and remote on-demand retrieved information.

Figure 4:
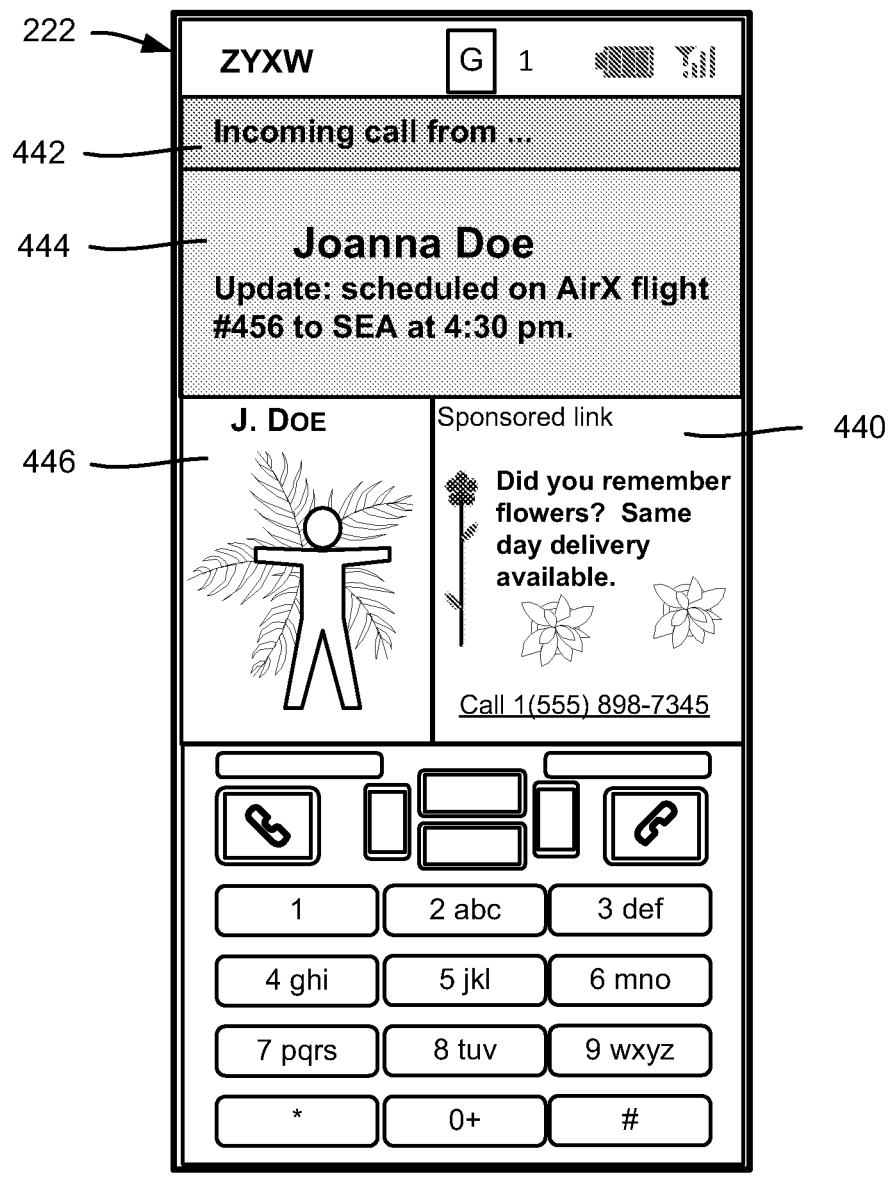
FIG. 4 is a representation of an example mobile telephone including a user interface on which relevant content appears in conjunction with an incoming telephone call.

FIG. 4 provides an alternative example that operates to provide content with respect to an incoming call. In this example, various information about the call and caller is provided, along with an advertisement 440 related to the call. For example, the region labeled 440 visually notifies the user that there is an incoming call, while the region labeled 442 indentifies the caller and possibly other information about the caller, which in this example is flight information. A picture 446 or the like representing the caller is also displayed in this example.

With respect to the advertisement 440, the caller's telephone number is one mechanism for selecting a relevant advertisement. Other mechanisms may be based on known profile information and/or state data; further, a dynamically computed estimate may be used to make a selection, such as from among a number of candidate advertisements. By way of example, if a number of calls are made to and received from this caller, it is likely that the caller is a relatively close acquaintance. The caller's name (Joanna) is female, and the caller's related information indicates an airplane flight, arrival location and time, which based on the current time (state data), may be known to be arriving later today or tomorrow. Thus, an appropriate advertisement for flowers with same-day delivery is selected; if the call recipient is later detected as traveling towards the airport (additional state data) around the scheduled arrival time, an advertisement for flowers along the route to the airport or for an airport florist may appear. Note that while the example of FIG. 4 is directed to an incoming call, the use of such profile information, state data and/or computed estimations may be used in selecting relevant content corresponding to outgoing communications.

As another example, the information that is considered useful may vary based on the context. For a business that is called for the first time, useful information may include reviews, ratings, directions and maps. For a business which has been called many times, useful information may include news items or changes in reviews, ratings, product offerings or the website of that business. With or without context changes, the content may be changed over time in order to keep the user's attention.

Returning to the caching model of FIG. 2, for any given advertisement, an updated advertisement may be cached each time the cache data store is re-synchronized. Note that FIG. 2 associates an action with a telephone number, in which the action is related to outputting content in some way, which may be as simple as displaying text or graphics as a number is scrolled or dialed, or if a call is incoming (caller ID provides the number). Depending on the sophistication of the selection logic in the application 244 or elsewhere (e.g., an application-independent content retrieval component called by any application), a more elaborate action may be taken. For example, an action may specify that certain content is to be displayed if not expired based on an associated timestamp, otherwise a link should be followed to display updated content. Note that with the model of FIG. 1 or via a cached link that is followed on demand, an advertisement may be changed relatively often, e.g., to increase the special price as business increases, or decrease the special price as business decreases. A coupon code or the like (described below) may be used to match the price to the advertisement.

Figure 5:
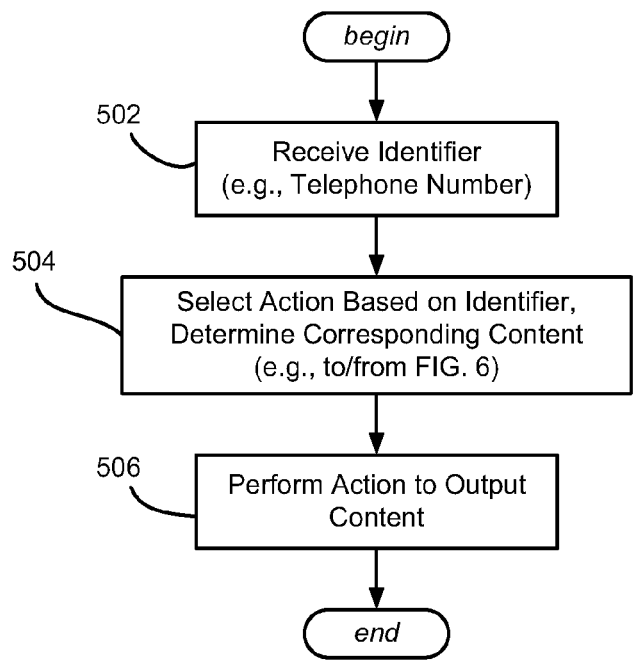
FIG. 5 is a flow diagram showing example steps taken to output relevant content based on an identifier such as a telephone number.

FIG. 5 summarizes the operation of taking such an action, whether at the service provider as in FIG. 1, or (at least partially) within the initiating device as in FIG. 2. In general, as represented by step 502, an identifier such as a telephone number is received, whether via a pre-dialing scrolling selection, partial dialing (after so many digits are entered, devices can determine from the contacts/call history lists what number the user is likely dialing) or post-dialing for a telephone number, or selection or sending for another type of communication. Note that an intermediary can intercept a telephone call actually dialed and provide the user with an advertisement at that time or with an option regarding an advertisement, e.g., "press one to hear about company X's specials, or press two or wait for five seconds to continue your call." One such advertisement may essentially replace a ringtone, and also may be accompanied by graphics. In an alternative to unexpected interceptions, a user that wants to hear (and possibly additionally see) what is being offered may first dial a special number or prefix when calling the desired number, call the desired number but press a special send button or double-press the normal send button, and so forth.

Step 504 selects an action corresponding to the identifier, generally using the identifier (e.g., telephone number) as a keyword in a search for relevant content. As described above, this may be a simple one-to-one operation that for each identifier displays matching content and/or provides audio, or may be based on a more elaborate selection mechanism. For example, various revenue models exist that select among relevant advertisements based on advertiser bids in conjunction with click-through frequency and possibly other criteria in an attempt to maximize revenue to the intermediary, e.g., in addition to bid prices, more-frequently chosen advertisements may generate higher revenue and thus get more weight in the selection process than do less-frequently chosen advertisements, even those bid at a higher price.

Step 506 represents performing the action, which in the above examples displays a relevant advertisement. Other possible actions include sending a text or audio message, sending content to another device (or devices) associated with that user, and so forth. Actions may correspond to outputting simple text or graphics, and/or the actions themselves may include rules that the application handling the action can interpret, such as output image A if before noon and output image B if after noon.

Figure 6:
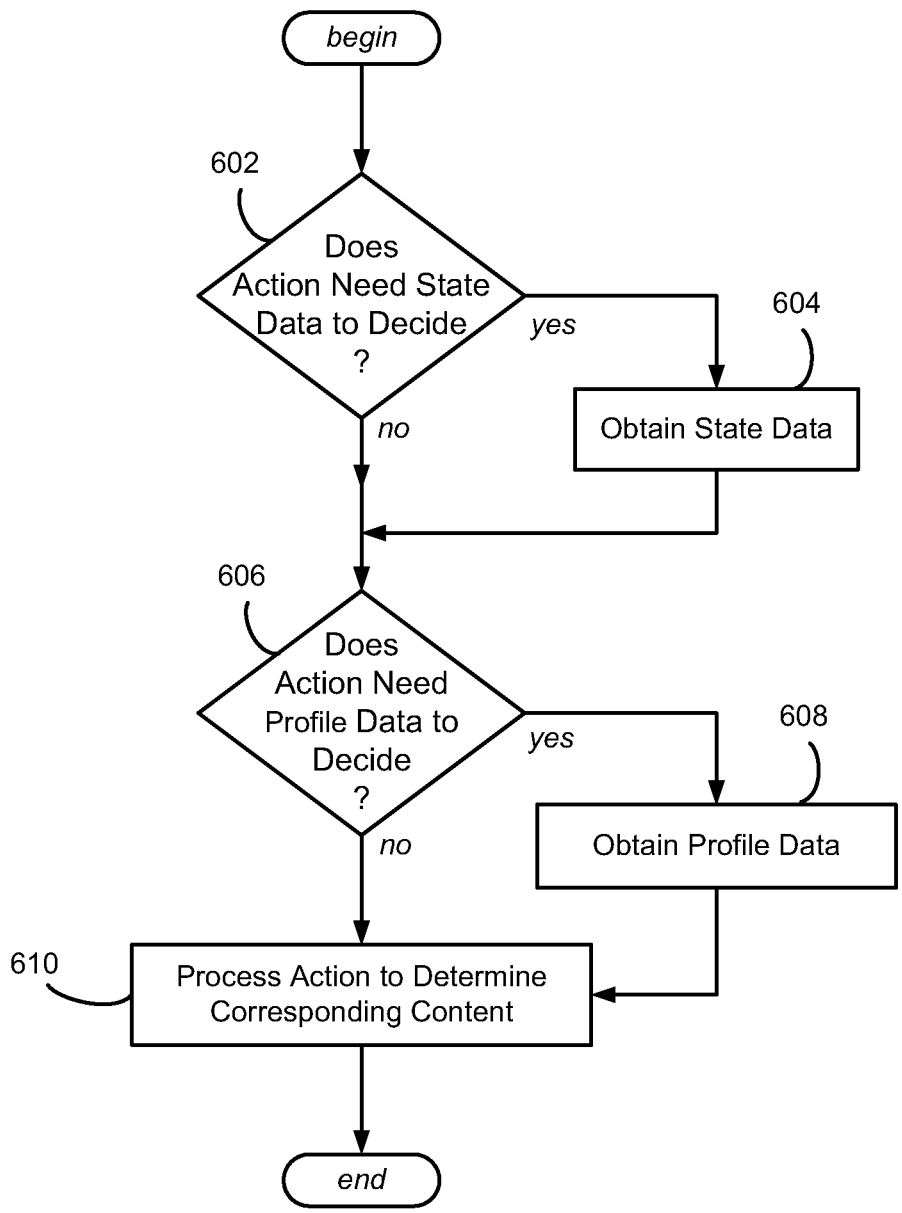
FIG. 6 is a flow diagram showing example steps taken to process an action to determine content to output based on an identifier such as a telephone number and possibly state data and/or user profile data.

FIG. 6 is a flow diagram generally showing example steps taken to process an identifier-selected action so as to determine corresponding content to output. These steps may be taken at the advertisement center as an advertisement is needed, or as part of selecting which user should get which advertisement for each number and synchronizing the selected advertisements to a cache, and/or may be executed on the local device. For example, two advertisements may be cached in association with one telephone number; the time of day may be used to determine which of the two advertisements to output when a user scrolls to or dials that telephone number.

Step 602 evaluates whether the action needs state data to decide on which content to output. For example, as mentioned above, some content may expire, whereby state data in the form of a current time may be needed to make a decision. If state data (e.g., time, user location, user traveling direction and the like) is needed, step 604 obtains the state data.

Step 606 evaluates whether the action needs state data to decide on which content to output. For example, if the user's age is known, a more age-appropriate advertisement may be selected from among a set of possible advertisements to output. If profile data is needed, step 608 is executed to attempt to locate the data; default content may be selected if, for example, a user's age is not known.

Step 610 represents processing the action to determine corresponding content to output, or to send to a user's cache. For example, while current state data may need to be evaluated at the user's telephone to select one cached advertisement instead of another, the profile information may be used at the advertising center to determine that only those two advertisements are candidates for a given telephone number, with selection to be decided by the user's device based on the current time.

Figure 7:
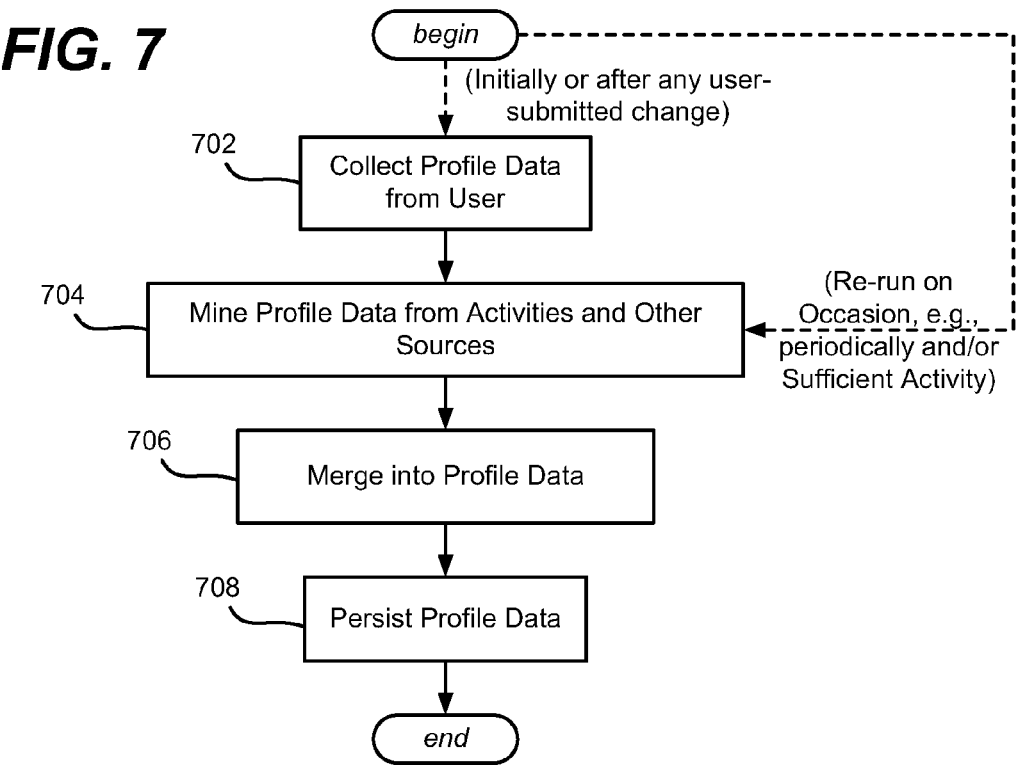
FIG. 7 is a flow diagram showing example steps taken to obtain user profile data that may be used in determining relevant content.

FIG. 7 shows various example aspects related to collecting profile data, beginning at step 702 where a user may provide such data, or change such data. This may include information such as age, sex, marital status, home and work addresses, but also preference data such as a particular coffee shop, fast food franchises, and so forth; dislikes may also be submitted. Such information may be directly provided by the user to an advertising service, and/or may be provided by the carrier, for example.

Step 704 represents mining profile data from the user's activities and other data sources, which may take place occasionally, e.g., periodically and/or after some threshold amount of activity is reached, such as every fifty telephone calls. Example of data mined from such activities include telephone numbers frequently called, calling patterns (e.g., analyzed through collaborative filtering and graph analysis), email addresses to which messages are regularly sent, other searches and advertisements, other application logs, location tracks, SMS content, and so forth. Examples of other information include things like social networking buddy lists, past purchases made via this device or an associated device, and so forth.

Step 706 represents merging the various profile data into a suitable data structure or the like. Step 708 represents persisting the profile data in association with this user, or device, such as by the device's telephone number. In this manner, profile data is regularly available (e.g., at step 608 of FIG. 6) to assist in decision making with respect to selecting content to provide.

Figure 8:
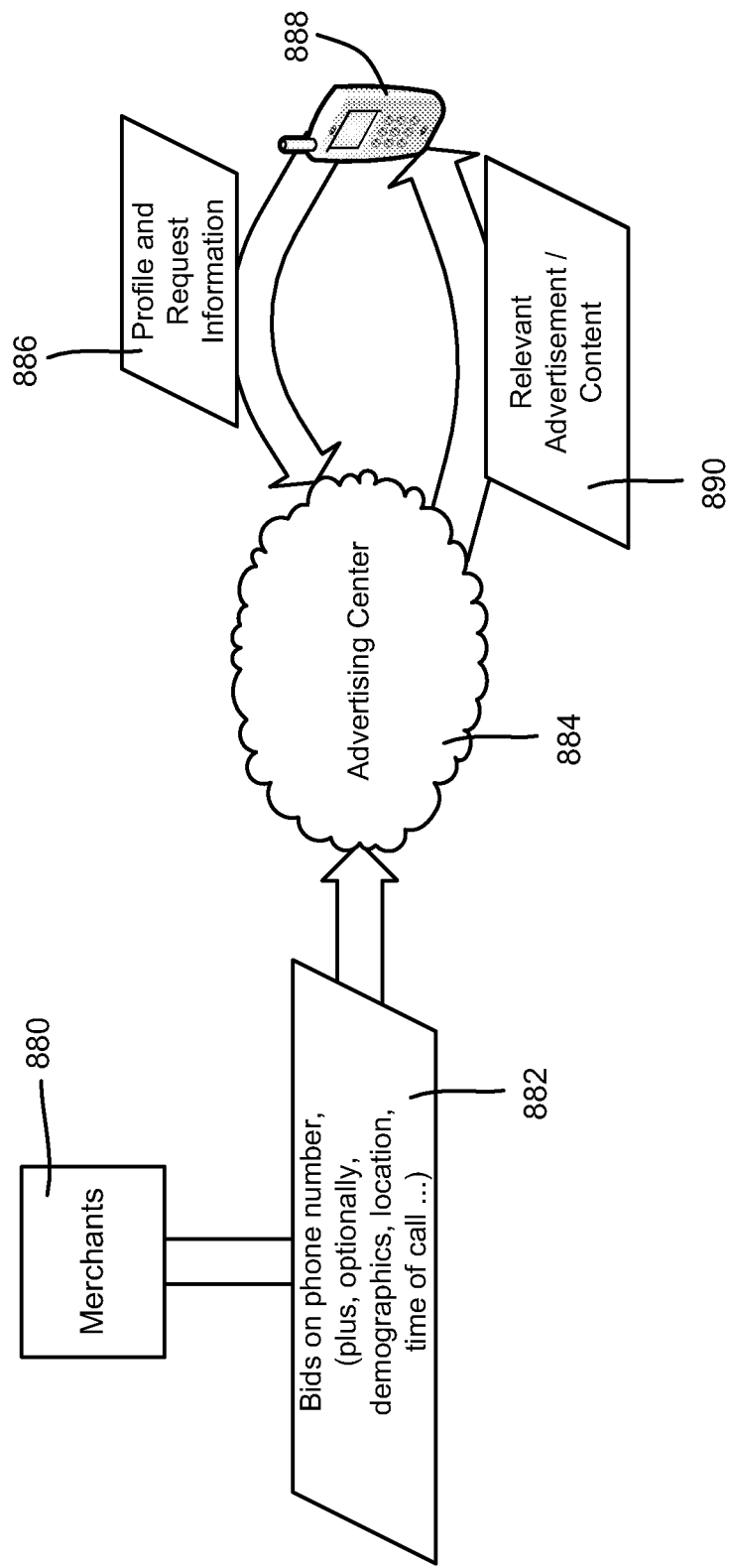
FIGS. 8-10 are block diagrams representing example business concepts that may be implemented via identifier-based selection of relevant content.
Figure 9:
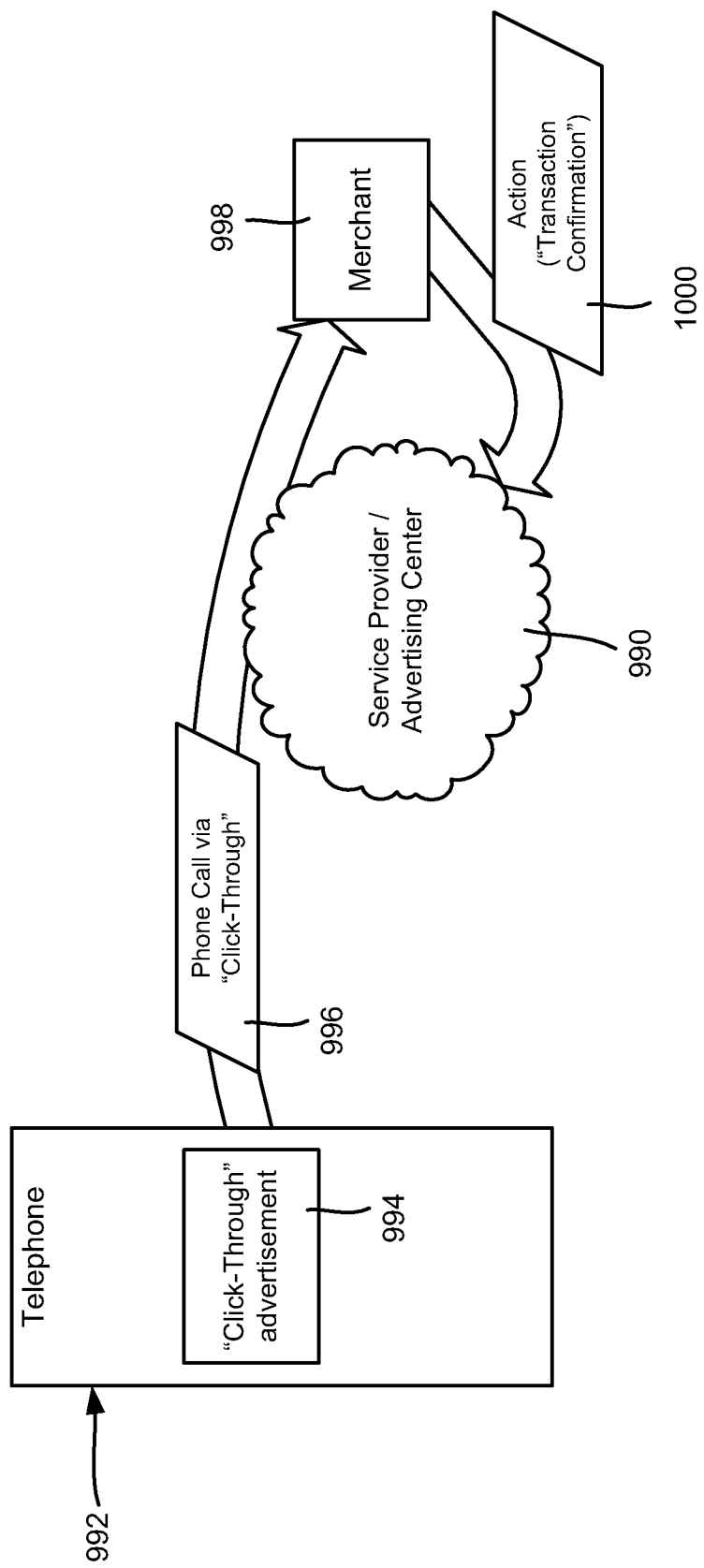
Figure 10:
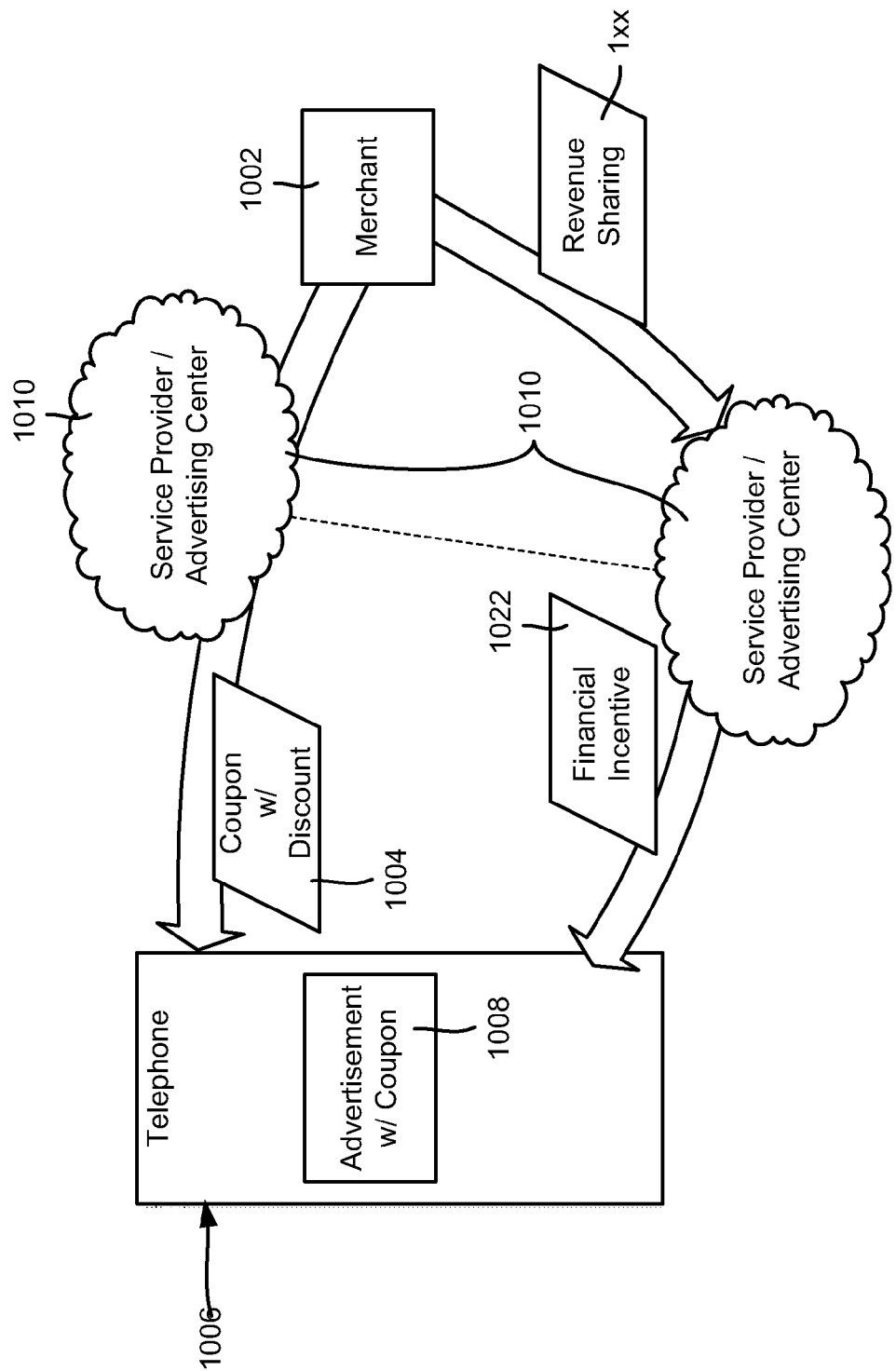

FIGS. 8-10 are diagrams representing some of the many possible business models that may be based upon the technology described herein. For example, FIG. 8 represents a model in which merchants 880 submit advertising-related bids 882 on telephone numbers and/or other communication-related identifiers (e.g., email addresses, chat addresses, a Windows Live™ ID, user credentials, a QQ number, and so forth). Additional criteria to better target likely consumers, such as profile data to match (e.g., demographics, likes, a list of friends and/or the like) and/or current state data to match (e.g., location, traveling direction, time of day and/or the like) and so forth may be part of the bid. By way of example, a pizza restaurant may bid to show its advertisement on scrolling to or dialing a competing restaurant's telephone number, but only wants an advertisement sent during the pizza restaurant's operating hours, and only when the caller is within a certain location as determined by cell towers or GPS data, if available.

An advertising center 884 receives the bids and uses them in a revenue generation model that determines which advertisements to send to which users; in the example of a mobile telephone, the advertising center is coupled to a service provider and each advertisement each sent based upon a scrolled-to or dialed telephone number. The advertising center 884 also receives profile and requested information 886 from users, represented by the telephone device 888. As described above, the information may be directly provided by a user, and/or mined from the user to the extent known.

By way of example, frequently-called telephone numbers to individuals (rather than businesses) are likely made to friends, relatives and other acquaintances, whereby as described above, any reviews corresponding to those numbers may be given more weight with this user. As another example, if some calls are made to a golf course, then it may be deduced from mined phone number information that the user plays golf. Further, after mining even without again relating this to an incoming or destination phone number, but rather to the user's telephone number, a user may receive targeted advertisements related to golf. For example, whenever a user turns on the telephone in a new location and sends the data (e.g., the user's telephone number) from which the profile may be looked up or computed, or sends the profile itself, golf advertisements may be sent. A user may also specifically request certain types of advertisements be sent, such as describing that morning's coffee special.

Based on the bids, criteria and possibly other factors (such as likelihood of ad-clicking), along with the profile data and any other information, the advertising center selects a relevant advertisement 890 or other content (or a link thereto) and sends it to the device 888. The advertisement or other content may be immediately displayed, or cached for later use; if cached, the advertisement or other content may be part of a larger amount of information being synchronized.

FIG. 9 is an example business model of how a service provider/advertising center 990 may generate additional revenue from the advertising beyond a fee for sending the advertisement. More particularly, when a telephone 992 or other device is displaying an advertisement that is selected in some way, e.g., a click-through advertisement 994 (which include advertisements in which the user needs to dial the advertised number rather than simply selecting/clicking the advertisement in some way), a call 996 is placed to the merchant 998. In turn, the merchant 998 may confirm the call and/or a transaction via some action 1000. Note that various mechanisms may be used to correlate the merchant-provided data/action 1000 with the advertisement 994, e.g., the telephone 992 can indicate to the service provider/advertising center 990 which advertisement is being displayed at the time a call 996 is made, whereby a referral fee may be charged. Whether a transaction actually occurs (e.g., resulting in a transaction fee) may be less certain, however coupon codes (FIG. 10), statistics, records of payment services such as credit cards, and other ways to correlate transactions with advertisements may be used, including models in which a merchant that generates the most revenue has a higher probability of having its advertisement selected for display over others.

Figure 11:
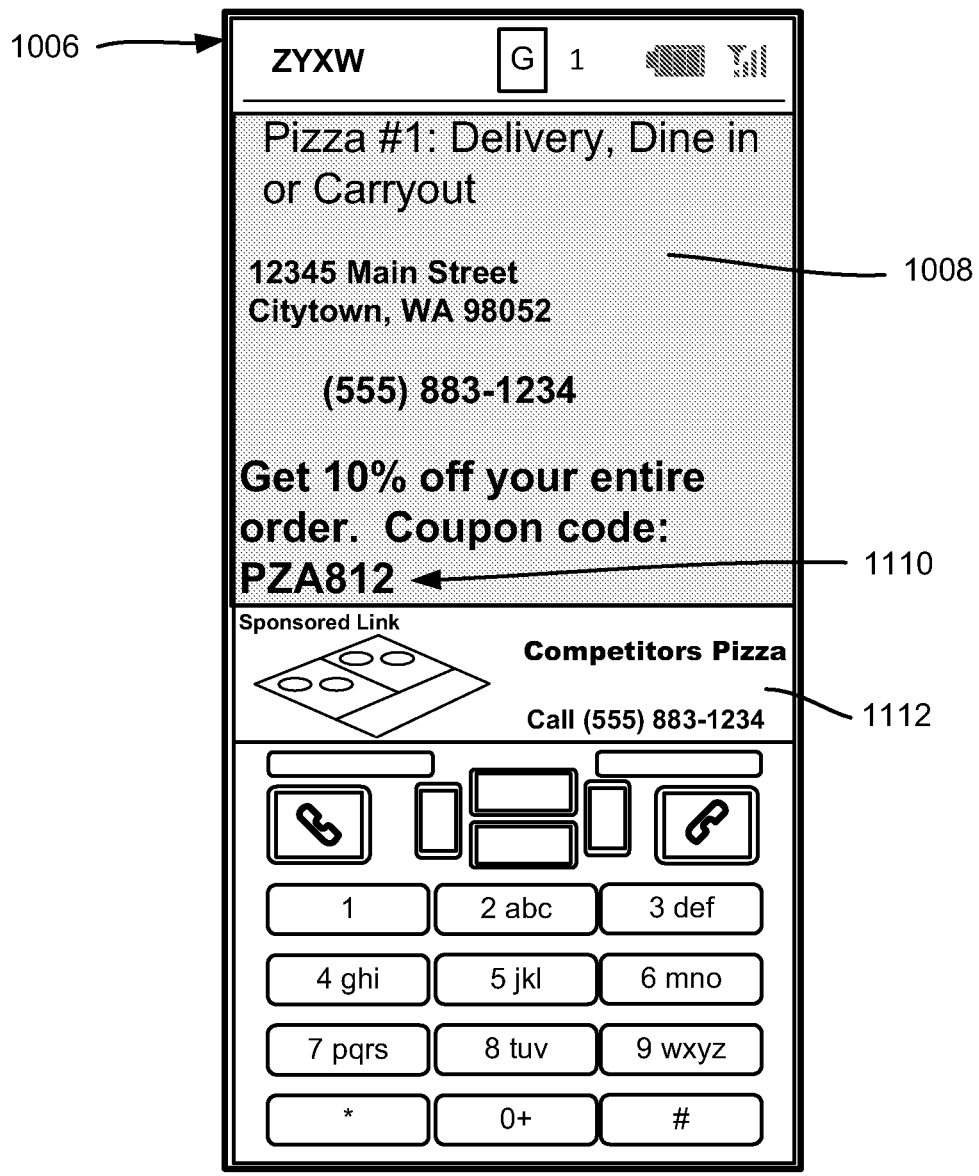
FIG. 11 is a representation of an example mobile telephone including a user interface on which relevant content in the form of a coupon and a competing advertisement is made visible to a user.

FIG. 10 exemplifies how a business model may work based on an advertisement that provides a coupon with a coupon code. A merchant 1002 provides the coupon 1004, which is displayed on the user's telephone 1006 in an advertisement 1008. Note that while the merchant originates the advertisement, the actual coupon and/or code may be generated by the service provider/advertising center 1010. As represented in FIG. 11, the advertisement with coupon 1008 typically includes a code 1110; (note that an additional advertisement 1112 such as from a competing merchant may also appear). If the coupon is used as verified via its code, the merchant 1002 shares some of its revenue with the service provider/advertising center 1010 as a fee for the transaction, as represented in FIG. 10 via the block labeled 1020. Note that in order for the user to receive the discount, the coupon code may need to be validated through the service provider/advertising center 1010 (which also may bill the user for the merchant fee). In addition to the discount from use of the coupon, the user may receive some financial incentive 1022 for using the coupon, such as additional free airtime, a reduction on the service provider's bill, a rebate, and so forth. The user may also receive such a financial incentive 1022 even without the explicit use of a coupon. Such incentives serve to encourage the users to perform transactions through the advertisements served from the service provider/advertising center 1010. Thus, users also benefit from such a model, whereby many users will choose to welcome such targeted advertising on their devices.

Figure 12:
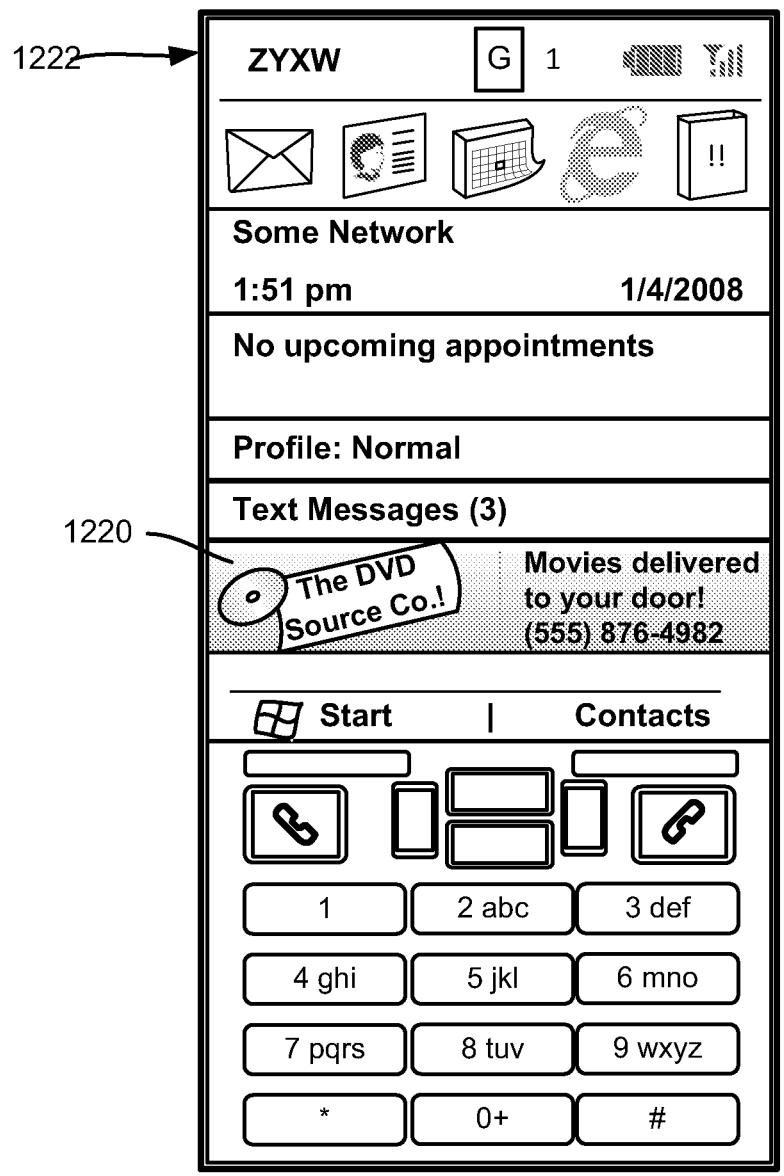
FIG. 12 is a representation of an example mobile telephone including a user interface on which relevant content in the form of an advertisement is made visible to a user on a home screen.

FIG. 12 represents one additional example scenario, in which an advertisement 1220 appears on a startup/home screen of a device 1222. Such an advertisement is chosen based on the device's telephone number, and is generally targeted. For example, based on previous calls to a DVD rental source, and/or based on a route being taken or previously taken (e.g., via GPS tracking), it is determined that this user often rents movies on Saturdays. Thus, such an advertisement may appear starting on Saturday morning and remain displayed until the user calls the number or at 9:00 pm on Saturday, at which time it may be replaced by another advertisement. Note that while a home screen is shown, any application can have such an advertisement appear, at least temporarily, such as shown at program start up and then fading away. In general, the technology described herein integrates web information and advertisements seamlessly throughout the mobile device's user interface, as well as the user interface of possibly other associated devices.

Indeed, any user interface screen on any identified device that is associated with this user or group of users may be used to output relevant content such as an advertisement. Any suitable delivery mechanism may be used, such as SMS/MMS, email, customized content transmission for immediate use or caching, and so forth, and delivery may be to a different device.

With respect to non-advertising content, a called or calling device may output a customized personal note, such as based on third party web services that the caller or callee pre-registered. The callee can specify different personal notes based on the caller's caller ID to provide a more targeted information sharing. When the callee is not available, the caller may not only get a voice mail box or other voice response as is typical, but may also get a visual display on the caller phone or caller IP device.

Exemplary Operating Environment

Figure 13:
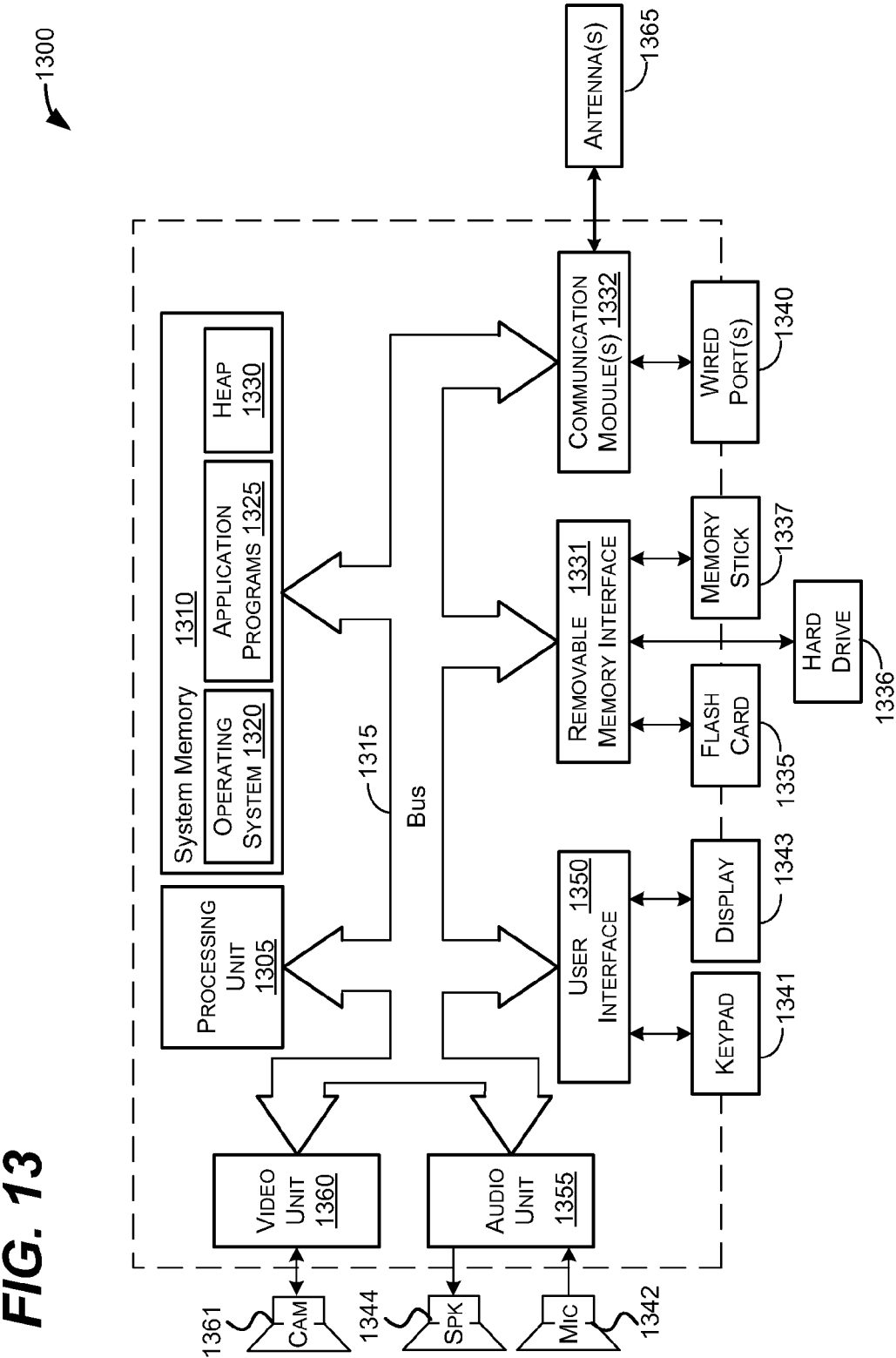
FIG. 13 shows an illustrative example of a computing and communication device into which various aspects of the present invention may be incorporated.

FIG. 13 illustrates an example of a suitable mobile device 1300 on which aspects of the subject matter described herein may be implemented, e.g., as a device for implementing any of the exemplified mobile telephones of FIGS. 1-10. The mobile device 1300 is only one example of a device and is not intended to suggest any limitation as to the scope of use or functionality of aspects of the subject matter described herein. Neither should the mobile device 1300 be interpreted as having any dependency or requirement relating to any one or combination of components illustrated in the exemplary mobile device 1300.

With reference to FIG. 13, an exemplary device for implementing aspects of the subject matter described herein includes a mobile device 1300. In some embodiments, the mobile device 1300 comprises a cell phone, a handheld device that allows voice communications with others, some other voice communications device, or the like. In these embodiments, the mobile device 1300 may be equipped with a camera for taking pictures, although this may not be required in other embodiments. In other embodiments, the mobile device 1300 comprises a personal digital assistant (PDA), hand-held gaming device, notebook computer, printer, appliance including a set-top, media center, or other appliance, other mobile devices, or the like. In yet other embodiments, the mobile device 1300 may comprise devices that are generally considered non-mobile such as personal computers, servers, or the like.

Components of the mobile device 1300 may include, but are not limited to, a processing unit 1305, system memory 1310, and a bus 1315 that couples various system components including the system memory 1310 to the processing unit 1305. The bus 1315 may include any of several types of bus structures including a memory bus, memory controller, a peripheral bus, and a local bus using any of a variety of bus architectures, and the like. The bus 1315 allows data to be transmitted between various components of the mobile device 1300.

The mobile device 1300 may include a variety of computer-readable media. Computer-readable media can be any available media that can be accessed by the mobile device 1300 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 1300.

Communication media may include any information delivery media, typically embodied in computer-readable instructions, data structures, program modules, and/or may include or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, Wi-Fi, WiMAX, and other wireless media. Combinations of any of the above also may be included within the scope of computer-readable media.

The system memory 1310 includes computer storage media in the form of volatile and/or nonvolatile memory and may include read only memory (ROM) and random access memory (RAM). On a mobile device such as a cell phone, operating system code 1320 is sometimes included in ROM although, in other embodiments, this is not required. Similarly, application programs 1325 are often placed in RAM although again, in other embodiments, application programs may be placed in ROM or in other computer-readable memory. The heap 1330 provides memory for state associated with the operating system 1320 and/or the application programs 1325. For example, the operating system 1320 and application programs 1325 may store variables and data structures in the heap 1330 during their operations.

The mobile device 1300 may also include other removable/non-removable, volatile/nonvolatile memory. By way of example, FIG. 13 illustrates a flash card 1335, a hard disk drive 1336, and a memory stick 1337. The hard disk drive 1336 may be miniaturized to fit in a memory slot, for example. The mobile device 1300 may interface with these types of non-volatile removable memory via a removable memory interface 1331, or may be connected via a universal serial bus (USB), IEEE 13394, one or more of the wired port(s) 1340, or antenna(s) 1365. One of the antennas 1365 may receive GPS data. In these embodiments, the removable memory devices 1335-137 may interface with the mobile device via the communications module(s) 1332. In some embodiments, not all of these types of memory may be included on a single mobile device. In other embodiments, one or more of these and other types of removable memory may be included on a single mobile device.

In some embodiments, the hard disk drive 1336 may be connected in such a way as to be more permanently attached to the mobile device 1300. For example, the hard disk drive 1336 may be connected to an interface such as parallel advanced technology attachment (PATA), serial advanced technology attachment (SATA) or otherwise, which may be connected to the bus 1315. In such embodiments, removing the hard drive may involve removing a cover of the mobile device 1300 and removing screws or other fasteners that connect the hard drive 1336 to support structures within the mobile device 1300.

The removable memory devices 1335-1337 and their associated computer storage media, described above and illustrated in FIG. 13, provide storage of computer-readable instructions, program modules, data structures, and other data for the mobile device 1300. For example, the removable memory device or devices 1335-1337 may store images taken by the mobile device 1300, voice recordings, contact information, programs, data for the programs and so forth.

A user may enter commands and information into the mobile device 1300 through input devices such as a keypad 1341 and the microphone 1342. In some embodiments, the display 1343 may be touch-sensitive screen and may allow a user to enter commands and information thereon. The keypad 1341 and display 1343 may be connected to the processing unit 1305 through a user input interface 1350 that is coupled to the bus 1315, but may also be connected by other interface and bus structures, such as the communications module(s) 1332 and wired port(s) 1340.

A user may communicate with other users via speaking into the microphone 1342 and via text messages that are entered on the key pad 1341 or a touch sensitive display 1343, for example. The audio unit 1355 may provide electrical signals to drive the speaker 1344 as well as receive and digitize audio signals received from the microphone 1342.

The mobile device 1300 may include a video unit 1360 that provides signals to drive a camera 1361. The video unit 1360 may also receive images obtained by the camera 1361 and provide these images to the processing unit 1305 and/or memory included on the mobile device 1300. The images obtained by the camera 1361 may comprise video, one or more images that do not form a video, or some combination thereof.

The communication module(s) 1332 may provide signals to and receive signals from one or more antenna(s) 1365. One of the antenna(s) 1365 may transmit and receive messages for a cell phone network. Another antenna may transmit and receive Bluetooth® messages. Yet another antenna (or a shared antenna) may transmit and receive network messages via a wireless Ethernet network standard.

In some embodiments, a single antenna may be used to transmit and/or receive messages for more than one type of network. For example, a single antenna may transmit and receive voice and packet messages.

When operated in a networked environment, the mobile device 1300 may connect to one or more remote devices. The remote devices may include a personal computer, a server, a router, a network PC, a cell phone, a peer device or other common network node, and typically includes many or all of the elements described above relative to the mobile device 1300.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer storage memory device storing computer-executable instructions that, when executed by a computer, cause the computer to perform a method comprising:
   receiving a telephone number corresponding to a destination device that was transmitted because a user scrolled through a list of contacts on a source device and paused on the telephone number corresponding to the destination device for a sufficient amount of time without initiating a communication between the destination device and source device;
   selecting content based on the telephone number wherein the selected content is selected from a plurality of content that includes visible information and an audible advertisement; and
   transmitting the selected content to a device affiliated with the destination device or to the source device, wherein the selected content is transmitted for rendering based on a plurality of options that include: the source device pushing the selected content to the device affiliated with the destination device, the computer pushing the selected content to the device affiliated with the destination device, the device affiliated with the destination device pulling the selected content from a remote device, and the source device pulling the selected content.

2. The computer storage device of claim 1 wherein the device affiliated with the destination device includes a data store, and wherein transmitting providing the selected content to the device affiliated with the destination device comprises downloading information to the data store.

3. The computer storage device of claim 1 wherein the selecting the content comprises using profile data in selecting the content, or using current state data in selecting the content, or using profile data and current state data in selecting the content.

4. The computer storage device of claim 1, the method further comprising outputting a representation of the content via a user interface.

5. In a data communications environment having a computer, a method comprising: receiving a telephone number corresponding to a destination device that was transmitted because a user scrolled through a list of contacts on a source device and paused on the telephone number corresponding to the destination device for a sufficient amount of time without initiating a communication between the destination device and source device; selecting content based on the telephone number wherein the selected content is selected from a plurality of content that includes visible information and an audible advertisement; and
   transmitting the selected content to a device affiliated with the destination device or to the source device, wherein the selected content is transmitted for rendering based on a plurality of options that include: the source device pushing the selected content to the device affiliated with the destination device, the computer pushing the selected content to the device affiliated with the destination device, the device affiliated with the destination device pulling the selected content from a remote device, and the source device pulling the selected content.

6. The method of claim 5, wherein visible information comprises at least one visible advertisement, at least one review, at least one rating, at least one media listing, at least one menu of offerings, at least one set of directions, or at least one map; or any combination of at least one visible advertisement, at least one review, at least one rating, at least one media listing, at least one menu of offerings, at least one set of directions, or at least one map.

7. The method of claim 5, wherein visible information comprises text for a message comprising a text message or an email message, or selecting graphics, or selecting both text and graphics.

8. The method of claim 5, wherein selecting the content comprises accessing a remote source of the content, or accessing a local cache synchronized from a remote source of the content, or accessing a remote source for at least part of the content and accessing a local cache for at least part of the content.

9. The method of claim 5, wherein the content is selected based on profile data, current state data, or a combination of both the profile data and the current state data.

10. The method of claim 9, further comprising, mining at least some of the profile data based on previous user activities.

11. In a data communications environment, a system comprising: a source device; a destination device; a data store coupled to the destination device and the source device; and a computer executing selection logic configured to: receive a telephone number corresponding to the destination device that was transmitted because a user scrolled through a list of contacts on the source device and paused on the telephone number corresponding to the destination device for a sufficient amount of time without initiating a communication between the destination device and the source device; selecting content based on the telephone number wherein the selected content is selected from a plurality of content that includes visible information and an audible advertisement; and transmitting the selected content to a device affiliated with the destination device or to the source device, wherein the selected content is transmitted for rendering based on a plurality of options that include: the source device pushing the selected content to the device affiliated with the destination device, the computer pushing the selected content to the device affiliated with the destination device, the device affiliated with the destination device pulling the selected content from a remote device, and the source device pulling the selected content.

12. The system of claim 11, wherein the data store is incorporated into the destination device or the source device, and further comprising synchronization logic that obtains data in the data store from a remote source.

13. The system of claim 11, wherein the data store is coupled to the source device or the destination device via an external coupling.

14. The system of claim 11, wherein the selection logic selects the content by looking up an action in the data store based on the telephone number.

* * * * *